United States Patent [19]
Adrian et al.

[11] Patent Number: 5,533,598
[45] Date of Patent: Jul. 9, 1996

[54] HYDRAULIC SHOCK ABSORBER FOR MOTOR VEHICLES

[75] Inventors: Adolf Adrian, Ennepetal; Rolf Angermann, Herdecke, both of Germany

[73] Assignee: August Bilstein GmbH & Co. KG, Ennepetal, Germany

[21] Appl. No.: 350,792

[22] Filed: Dec. 7, 1994

[30] Foreign Application Priority Data

Dec. 18, 1993 [DE] Germany .......................... 43 45 116.0

[51] Int. Cl.[6] ...................................................... F16F 9/36
[52] U.S. Cl. ....................................................... 188/322.17
[58] Field of Search ....................... 188/322.17, 322.16, 188/322.19, 322.12; 277/33

[56] References Cited

U.S. PATENT DOCUMENTS

| | | | |
|---|---|---|---|
| 4,480,730 | 11/1984 | Koller | 188/322.17 |
| 4,989,701 | 2/1991 | Yamaoka | 188/322.17 |
| 5,176,229 | 1/1993 | Kanari | 188/322.17 |
| 5,178,243 | 1/1993 | Hamada | 188/322.17 |
| 5,224,573 | 7/1993 | Amemiya | 188/322.17 |

*Primary Examiner*—Robert J. Oberleitner
*Assistant Examiner*—C. T. Bartz
*Attorney, Agent, or Firm*—Max Fogiel

[57] ABSTRACT

A hydraulic dashpot for motor vehicles. It essentially comprises a fluid-filled shock-absorbing cylinder alone or accommodated in an outer cylinder and a piston that travels back and forth inside the shock-absorbing cylinder on the end of a piston rod. The piston rod extends through a centering component at one end of the shock-absorbing cylinder or of both cylinders and the edge of the shock-absorbing cylinder or of the outer cylinder is crimped around the centering component. The object is to improve support of the pressure-impact accommodator. The crimping (4) creates a neck (5) at that end of the shock-absorbing cylinder (1) that the impact-absorbing cap (6) rests against.

13 Claims, 3 Drawing Sheets

HYDRAULIC SHOCK ABSORBER FOR MOTOR VEHICLES

BACKGROUND OF THE INVENTION

A hydraulic dashpot is known from European Patent Application 535 409 A1. It essentially comprises a fluid-filled shock-absorbing cylinder and a piston mounted on the end of a piston rod and traveling back and forth inside the shock-absorbing cylinder. The piston rod extends through a centering assembly at one end of the shock-absorbing cylinder or, if the dashpot is a two-cylinder dashpot, of both the shock-absorbing cylinder and the outer cylinder. The piston-rod centering assembly is axially secured by crimping at least part of the edge of the shock-absorbing cylinder or outer cylinder. A pressure-impact accommodator in the form of an impact-accommodation disk rests against the uncrimped sections of the cylinder edge. There is a risk, especially when the diameter of the cylinder or cylinders is long, that the impact-accommodation disk cannot entirely accommodate powerful axial impacts and will push out.

The entire upper edge of the shock-absorbing cylinder or outer cylinder in another dashpot described in the same publication is crimped and accommodates a ring that seals off the cylinder. The impact-accommodation disk rests in this case directly against a composite base.

SUMMARY OF THE INVENTION

The object of the present invention is to improve support of the pressure-impact accommodator to the extent that it can accommodate even powerful axial forces without pushing out.

In accordance with the present invention accordingly one end of the shock-absorbing cylinder in the one-cylinder dashpot is crimped to create a neck and the impact-accommodation disk rests against the neck, whereas in a two-cylinder dashpot one end of the outer cylinder is crimped to create a neck and the impact-accommodation disk rests against the neck.

The inner surface of the shock-absorbing cylinder in a one-cylinder dashpot or of the outer cylinder in a two-cylinder dashpot can extend beyond the crimping. An end of this type well defines how the cap rests against the crimp.

The neck in one preferred embodiment of the present invention is approximately half as wide as the shock-absorbing cylinder or outer cylinder and the piston rod together.

The edge of the neck is at least axially bent to increase the surface for the impact-absorbing cap to rest against.

To keep contamination out of the space between the piston-rod centering component and the impact-absorbing cap, one preferred embodiment of the invention includes a seal between the piston rod and the cap. The radial area of the seal is between the centering component and the cap and its axial area surrounds the piston rod. The axial area has a stripping edge that scrapes the piston rod.

The present invention provides more effective support for the impact-absorbing cap, improved accommodation of any axial forces that occur, and protection of the composite base from external impact.

BRIEF DESCRIPTION OF THE DRAWINGS

Several embodiments of the invention will now be specified by way of example with reference to the accompanying drawing, wherein.

DESCRIPTION OF THE PREFERRED EMBODIMENTS

Figure 1:
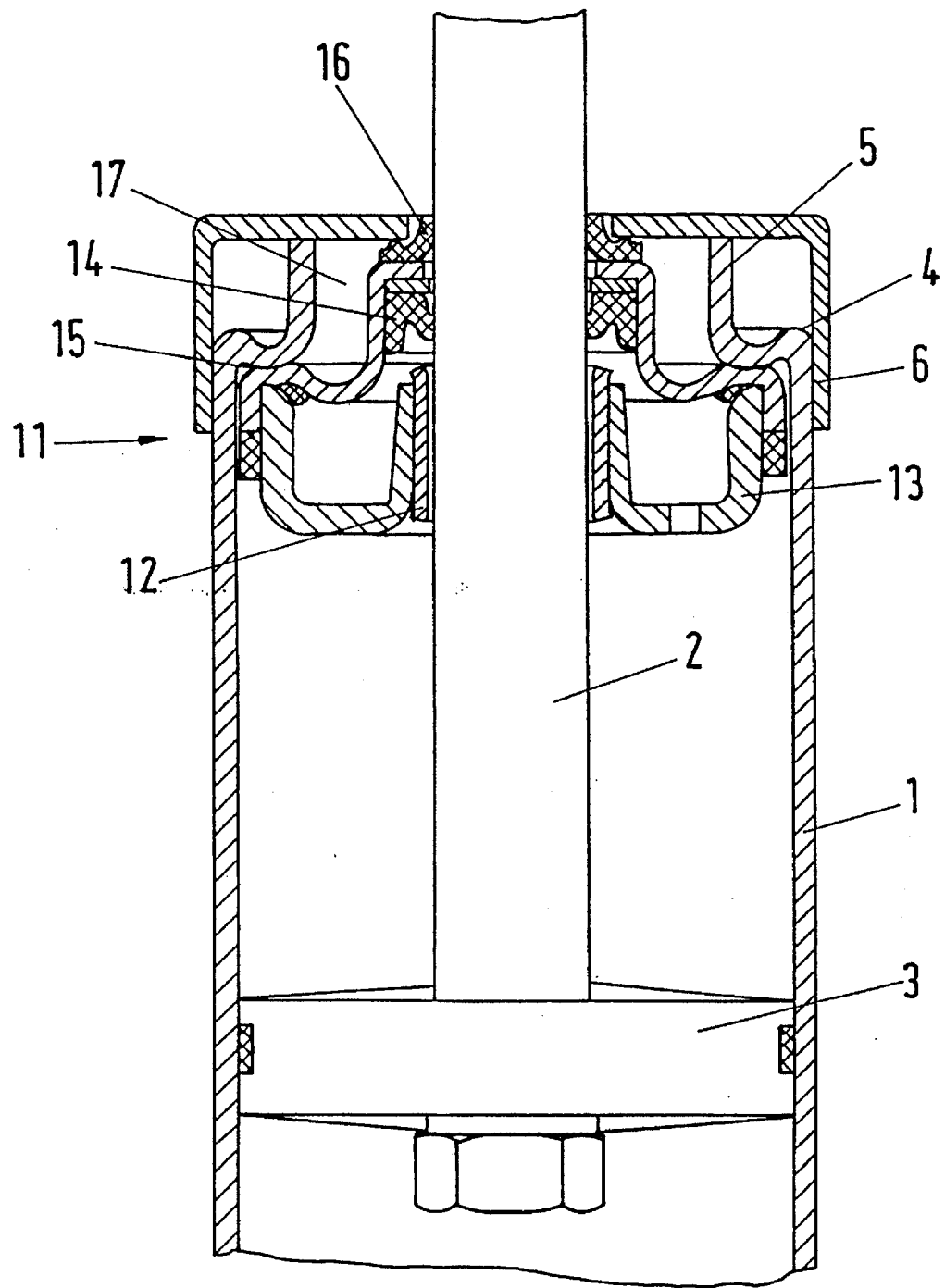
FIG. 1 illustrates part of a one-cylinder dashpot, FIG. 2 one version of the seal between the piston rod and the impact-absorbing cap, and FIG. 3 part of a two-cylinder dashpot.

The hydraulic one-cylinder dashpot partly illustrated in FIG. 1 essentially comprises a fluid-filled shock-absorbing cylinder 1 and a piston 3. There is a piston-rod centering component 11 over one end of the cylinder. Piston 3 is mounted on one end of a piston rod 2 that extends through centering component 11.

Piston-rod centering component 11 essentially comprises a centered sleeve 12 and a spacer 13. Sleeve 12 keeps piston rod 2 straight as it travels in and out of shock-absorbing cylinder 1. Spacer 13 is a metal stamping. There is an oil-tight seal 14 between spacer 13 and piston rod 2. Above spacer 13, piston rod 2 travels through an impact-absorbing cap 6 over the end of shock-absorbing cylinder 1. An unillustrated pressure-impact accommodator in the form of a rubber pad for example is forced against impact-absorbing cap 6 when the device contracts. The end of shock-absorbing cylinder 1 is crimped to create a neck 5. Spacer 13 is secured by crimp 4, and impact-absorbing cap 6 rests axially against neck 5.

Piston-rod centering component 11 can be secured only by the pressure of the fluid in shock-absorbing cylinder 1 for example. The inner surface 15 of shock-absorbing cylinder 1 extends beyond crimp 4 to establish a surface for centering component 11 to rest against.

Figure 2:
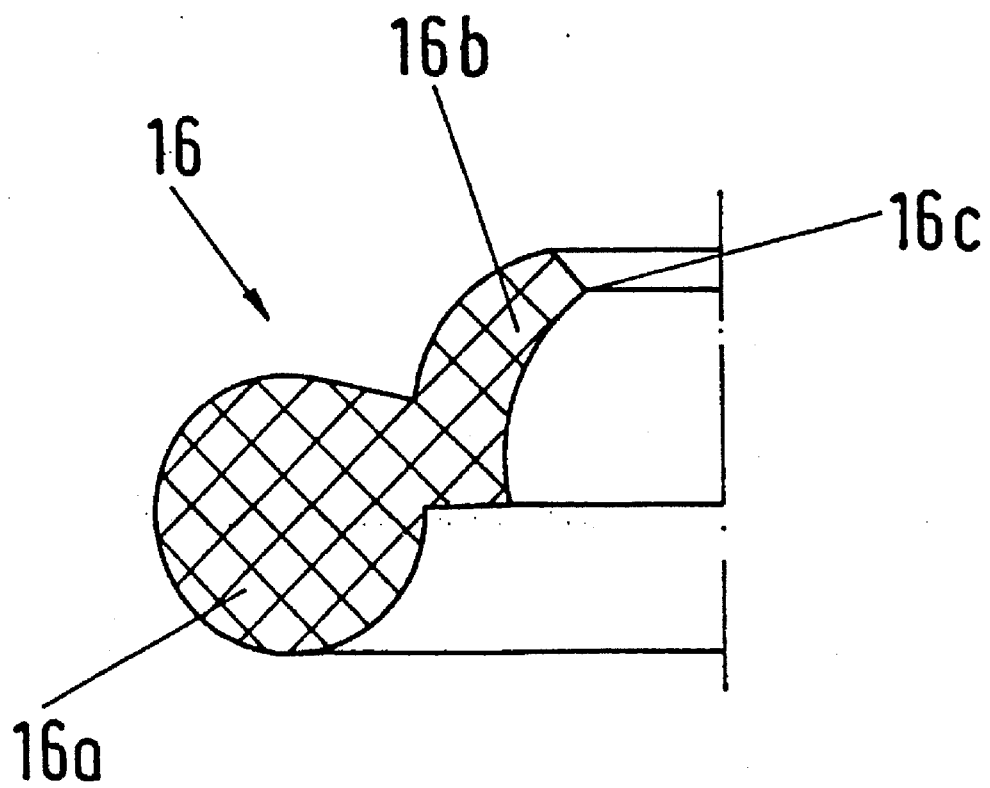

There is a seal 16 between piston rod 2 and impact-absorbing cap 6 to keep contamination out of the space 17 between the cap and the spacer 13 in piston-rod centering component 11. As will be evident from FIG. 2, the radial area 16a of the seal is between the spacer and the cap, and its resilience is low enough to ensure satisfactory tolerance compensation. The radial area 16a of the version illustrated in FIG. 2 is round. The axial area 16b of seal 16 surrounds piston rod 2. It has a stripping edge 16c that scrapes the rod.

Figure 3:
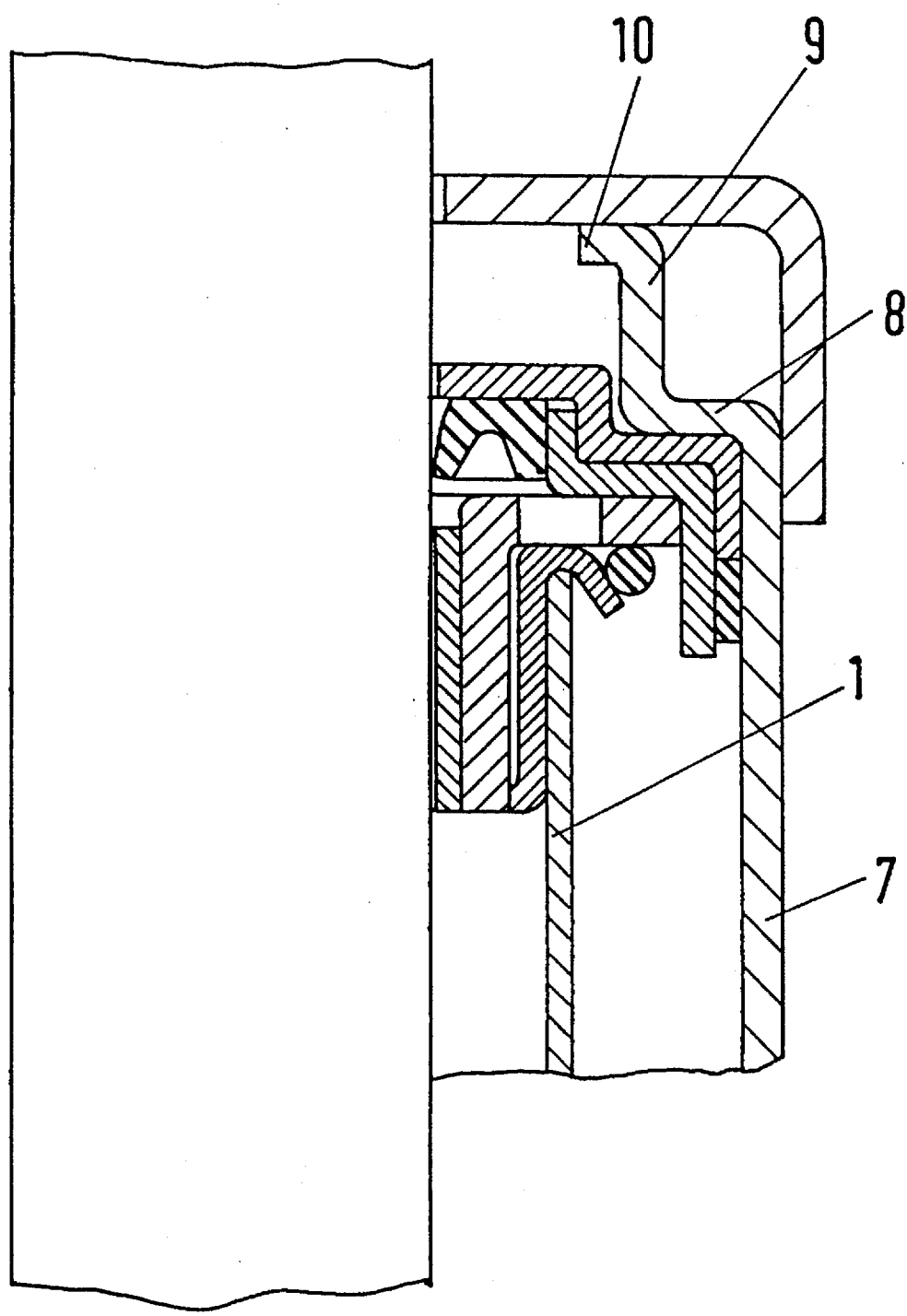

FIG. 3 illustrates a two-cylinder dashpot. Its outer cylinder 7 accommodates a pressure-compensation compartment 15. There is an impact-absorbing cap 6 over the end of outer cylinder 7. The end of the outer cylinder is crimped to create a neck 9. A spacer 13 is secured by crimping 8. The edge 10 is bent, in for instance, to provide a larger surface for impact-absorbing cap 6 to rest against.

To optimize the support for impact-absorbing cap 6, the neck 5 of shock-absorbing cylinder 1 or the neck 9 of outer cylinder 7 is half as wide as the supporting surface of the pressure-impact accommodator.

We claim:

1. A hydraulic dashpot for motor vehicles, comprising: a fluid-filled shock-absorbing cylinder having a top surface and parallel side walls; a piston traveling back and forth inside said shock-absorbing cylinder on an end of a piston rod; said piston rod extending through a centering component at one end of said shock-absorbing cylinder, said shock-absorbing cylinder having an edge crimped around said centering component; an impact-absorbing cap having an inside surface and an outside surface and resting against an end of said shock-absorbing cylinder, said crimped edge forming a neck at the end of said shock-absorbing cylinder that said impact-absorbing cap rests against, said cap being a point of impact resisting axial shock forces, said top surface and parallel side walls of said shock-absorbing cylinder having direct abutting contact with said inside surface of said impact-absorbing cap.

2. A hydraulic dashpot for motor vehicles, comprising: a fluid-filled shock-absorbing cylinder accommodated in an outer cylinder having a top surface and parallel side walls and a piston traveling back and forth inside said shock-absorbing cylinder on an end of a piston rod, said piston rod extending through a centering component at one end of both said shock-absorbing cylinder and said outer cylinder, said outer cylinder having an edge crimped around said centering component; an impact-absorbing cap having an inside surface and an outside surface and resting against an end of said outer cylinder, said crimped edge forming a neck at the end of said outer cylinder that said impact-absorbing cap rests against, said cap being a point of impact resisting axial shock forces, shock forces on said dashpot being transmitted to said outer cylinder, said top surface and parallel side walls of said shock-absorbing cylinder having direct abutting contact with said inside surface of said impact-absorbing cap.

3. A dashpot as defined in claim 1, wherein said shock-absorbing cylinder has an inner surface extending beyond said crimped edge.

4. A dashpot as defined in claim 2, wherein said outer cylinder has an inner surface extending beyond said crimped edge.

5. A dashpot as defined in claim 1, wherein said neck is substantially half as wide as said shock-absorbing cylinder and said piston rod added together.

6. A dashpot as defined in claim 2, wherein said neck is substantially half as wide as said shock-absorbing cylinder and said piston rod added together.

7. A dashpot as defined in claim 1, wherein said crimped edge of said neck is bent at least radially.

8. A dashpot as defined in claim 2, wherein said crimped edge of said neck is bent at least radially.

9. A dashpot as defined in claim 1, including a seal between said piston rod and said impact-absorbing cap; said seal having a radial area between said centering component and said cap, said seal having an axial area surrounding said piston rod, alignment of said piston rod and said seal being separate and independent of said cap.

10. A dashpot as defined in claim 2, including a seal between said piston rod and said impact-absorbing cap; said seal having a radial area between said centering component and said cap, said seal having an axial area surrounding said piston rod, alignment of said piston rod and said seal being separate and independent of said cap.

11. A dashpot as defined in claim 9, wherein said axial area has a stripping edge scraping said piston rod.

12. A dashpot as defined in claim 10, wherein said axial area has a stripping edge scraping said piston rod.

13. A hydraulic dashpot for motor vehicles, comprising: a fluid-filled shock-absorbing cylinder; a piston traveling back and forth inside said shock-absorbing cylinder on an end of a piston rod; said piston rod extending through a centering component at one end of said shock-absorbing cylinder, said shock absorbing cylinder having an edge crimped around said centering component; an impact-absorbing cap resting against an end of said shock absorbing cylinder, said crimped edge forming a neck at the end of said shock-absorbing cylinder that said impact-absorbing cap rests against, said cap being a point of impact resisting axial shock forces; said shock-absorbing cylinder having an inner surface extending beyond said crimped edge; said neck being substantially half as wide as said shock-absorbing cylinder and said piston rod together; said crimped edge of said neck being bent at least radially; a seal between said piston rod and said impact-absorbing cap; said seal having a radial area between said centering component and said cap, said seal having an axial area surrounding said piston rod, alignment of said piston rod and said seal being separate and independent of said cap; said axial area having a stripping edge scraping said piston rod.

* * * * *